(12) United States Patent
Mandagere et al.

(10) Patent No.: US 11,250,136 B2
(45) Date of Patent: Feb. 15, 2022

(54) SCANNING A BACKUP FOR VULNERABILITIES

(71) Applicant: Cohesity, Inc., San Jose, CA (US)

(72) Inventors: Nagapramod Mandagere, Mountain View, CA (US); Karandeep Singh Chawla, Santa Clara, CA (US); Virupaksha Kanjilal, Baltimore, MD (US); Nilesh Pathak, Sunnyvale, CA (US)

(73) Assignee: Cohesity, Inc., San Jose, CA (US)

( * ) Notice: Subject to any disclaimer, the term of this patent is extended or adjusted under 35 U.S.C. 154(b) by 51 days.

(21) Appl. No.: 16/660,521

(22) Filed: Oct. 22, 2019

(65) Prior Publication Data
US 2021/0117549 A1   Apr. 22, 2021

(51) Int. Cl.
*G06F 21/57* (2013.01)
*G06F 11/14* (2006.01)

(52) U.S. Cl.
CPC ........ *G06F 21/577* (2013.01); *G06F 11/1446* (2013.01); *G06F 2201/84* (2013.01); *G06F 2221/033* (2013.01)

(58) Field of Classification Search
CPC ............... H04L 9/0894; G06F 11/1464; G06F 11/1469; G06F 2201/82; G06F 21/57; G06F 11/1446; G06F 2201/033; G06F 2201/84
See application file for complete search history.

(56) References Cited

U.S. PATENT DOCUMENTS

| 7,437,764 | B1 | 10/2008 | Sobel |
| 8,086,585 | B1 | 12/2011 | Brashers |
| 8,364,648 | B1 * | 1/2013 | Sim-Tang ........... G06F 16/2358 707/674 |
| 8,607,342 | B1 * | 12/2013 | Liao ...................... G06F 21/568 726/22 |
| 9,268,689 | B1 | 2/2016 | Chen |
| 9,304,864 | B1 | 4/2016 | Bushman |
| 9,311,190 | B1 | 4/2016 | Bushman |
| 9,361,185 | B1 | 6/2016 | Bushman |
| 9,594,514 | B1 | 3/2017 | Bono |

(Continued)

OTHER PUBLICATIONS

"Backup Solution Guide"—Synology https://download.synology.com/download/www-res/brochure/backup_solution_guide_en-global.pdf (Year: 2019).*

(Continued)

*Primary Examiner* — Randy A Scott
(74) *Attorney, Agent, or Firm* — Van Pelt, Yi & James LLP

(57) ABSTRACT

A plurality of scanned backup snapshots are generated. A backup snapshot among a plurality of backup snapshots is selected. At least a portion of the selected backup snapshot is restored in a temporary environment to create a restored instance of at least the portion of the selected backup snapshot. A vulnerability scan of the restored instance of at least the portion of the selected backup snapshot is performed. One or more vulnerabilities of the scanned portion of the selected backup snapshot are tracked. A request associated with identifying a scanned backup snapshot to restore from the plurality of scanned backup snapshots is received. In response to the request, at least a predetermined identification of the one or more vulnerabilities of the selected backup snapshot is provided.

20 Claims, 5 Drawing Sheets

(56) References Cited

U.S. PATENT DOCUMENTS

| | | | |
|---|---|---|---|
| 9,983,812 B1 | 5/2018 | Don | |
| 10,162,528 B2 | 12/2018 | Sancheti | |
| 10,175,896 B2 | 1/2019 | Battaje | |
| 10,496,497 B1 | 12/2019 | Yadav | |
| 10,503,612 B1 | 12/2019 | Wang | |
| 10,877,928 B2 | 12/2020 | Nagrale | |
| 10,896,097 B1* | 1/2021 | Purcell | G06F 11/1451 |
| 2003/0033344 A1 | 2/2003 | Abbott | |
| 2006/0182255 A1 | 8/2006 | Luck, Jr. | |
| 2007/0153675 A1 | 7/2007 | Baglin | |
| 2010/0070725 A1 | 3/2010 | Prahlad | |
| 2010/0122248 A1 | 5/2010 | Robinson | |
| 2013/0179481 A1 | 7/2013 | Halevy | |
| 2013/0191347 A1 | 7/2013 | Bensinger | |
| 2013/0219135 A1 | 8/2013 | Knowles | |
| 2013/0322335 A1 | 12/2013 | Smith | |
| 2014/0052692 A1* | 2/2014 | Zhang | G06F 11/1453 707/639 |
| 2014/0359229 A1 | 12/2014 | Cota-Robles | |
| 2014/0372553 A1 | 12/2014 | Blackburn | |
| 2015/0193487 A1 | 7/2015 | Demidov | |
| 2015/0278046 A1 | 10/2015 | Zellermayer | |
| 2015/0370502 A1 | 12/2015 | Aron | |
| 2016/0034356 A1 | 2/2016 | Aron | |
| 2016/0070714 A1 | 3/2016 | D Sa | |
| 2016/0357640 A1 | 12/2016 | Bushman | |
| 2016/0357641 A1 | 12/2016 | Bushman | |
| 2016/0357769 A1 | 12/2016 | Bushman | |
| 2017/0031613 A1* | 2/2017 | Lee | G06F 3/0619 |
| 2017/0123935 A1 | 5/2017 | Pandit | |
| 2017/0185729 A1 | 6/2017 | Boray | |
| 2017/0206212 A1 | 7/2017 | Srivilliputtur Mannarswamy | |
| 2017/0212680 A1 | 7/2017 | Waghulde | |
| 2018/0004437 A1 | 1/2018 | Battaje | |
| 2018/0004764 A1 | 1/2018 | Sudarsanam | |
| 2018/0081766 A1 | 3/2018 | Ghuge | |
| 2018/0088973 A1 | 3/2018 | Subhraveti | |
| 2018/0113625 A1 | 4/2018 | Sancheti | |
| 2018/0212896 A1 | 7/2018 | Chang | |
| 2018/0293374 A1 | 10/2018 | Chen | |
| 2018/0329637 A1 | 11/2018 | Battaje | |
| 2019/0132203 A1 | 5/2019 | Wince | |
| 2019/0197020 A1 | 6/2019 | Yap | |
| 2019/0215358 A1 | 7/2019 | Kobayashi | |
| 2019/0220198 A1 | 7/2019 | Kashi Visvanathan | |
| 2019/0278662 A1 | 9/2019 | Nagrale | |
| 2021/0056203 A1* | 2/2021 | Qiao | G06F 16/21 |
| 2021/0103556 A1 | 4/2021 | Nagrale | |

OTHER PUBLICATIONS

"Recovering File from an Amazon EBS Volume Backup"—Josh Rad, AWS, Feb. 1, 2019 https://aws.amazon.com/blogs/compute/recovering-files-from-an-amazon-ebs-volume-backup/ (Year: 2019).*

Cohesity, Cohesity Data Protection White Paper, 2016, Cohesity, pp. 1-12 (Year: 2016).

Gaetan Castlelein, Cohesity SnapFS and SnapTree, Aug. 9, 2017, Cohesity, pp. 1-4 (Year: 2017).

* cited by examiner

SCANNING A BACKUP FOR VULNERABILITIES

BACKGROUND OF THE INVENTION

Vulnerability scans are performed periodically to discover and resolve security threats on a system. For example, the system is scanned to identify known weaknesses in applications of the system. The system being scanned may be a primary system handling live production data. Performing a vulnerability scan on the primary system may strain system resources and cause the primary system to encounter performance issues. This may cause administrators of the primary system to reduce the frequency of vulnerability scans or worse not perform vulnerability scans to not reduce the performance of the primary system. This increases chances of the primary system being compromised. Other systems may install on the primary system an agent to perform a vulnerability scan. However, the agent may need to be maintained with one or more update patches, which may result in downtime associated with the primary system.

BRIEF DESCRIPTION OF THE DRAWINGS

Various embodiments of the invention are disclosed in the following detailed description and the accompanying drawings.

DETAILED DESCRIPTION

Figure 1:
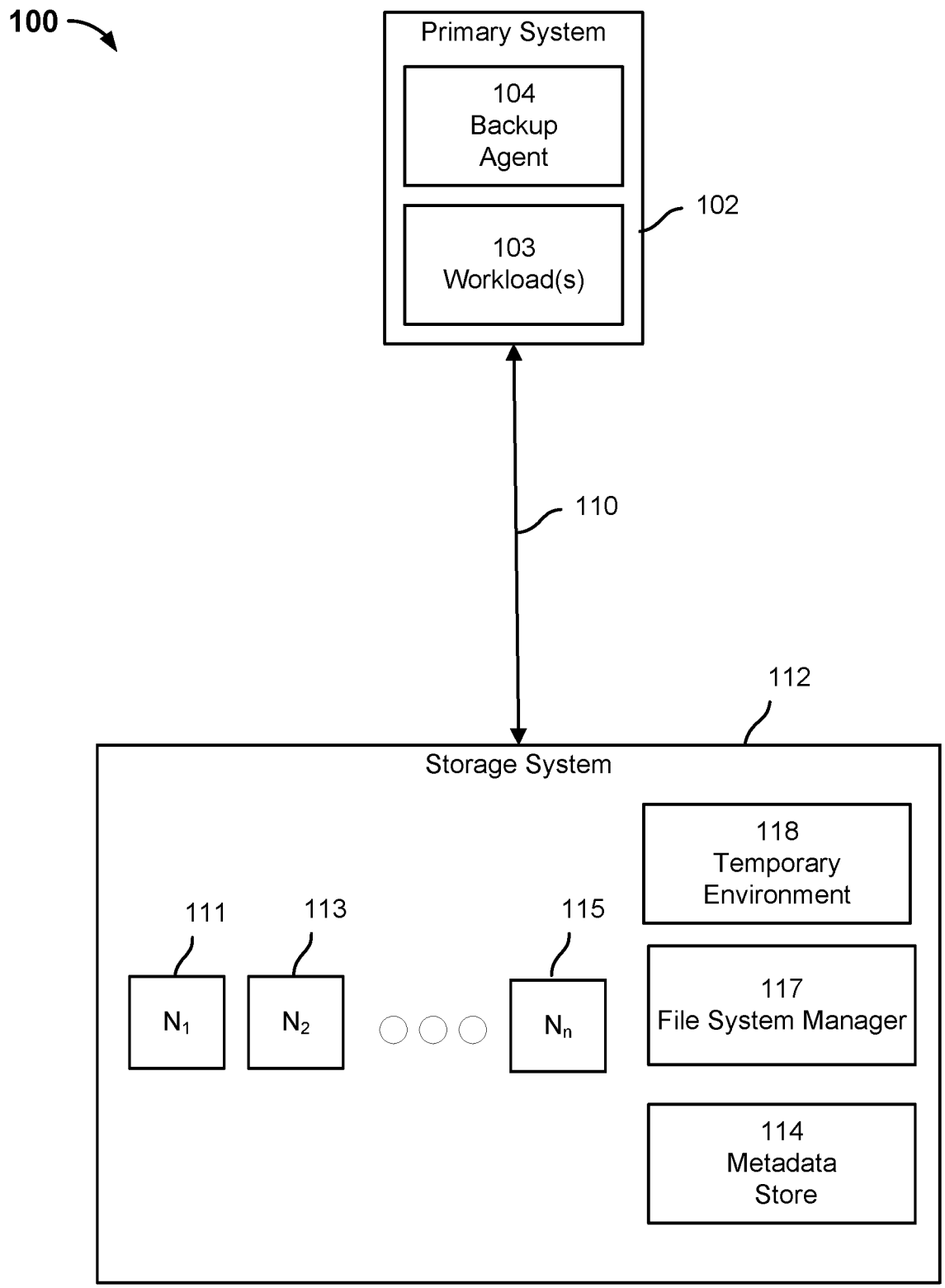
FIG. 1 is a block diagram illustrating a system for performing vulnerability scans in accordance with some embodiments.

A primary system may host one or more workloads. An example of a workload is an application, a virtual machine, a container, a pod, a database, etc. The primary system may be coupled to a storage system. The primary system may be configured to perform a backup snapshot of its data to the storage system. The primary system may perform a backup snapshot of file system data according to a backup policy and send the backup snapshot to a storage system. A backup snapshot may represent the state of a system at a particular point in time (e.g., the state of the file system data or the state of a workload). The backup snapshot policy may require a full backup snapshot or an incremental backup snapshot to be performed. A full backup snapshot may include the entire state of the primary system at a particular point in time. An incremental backup snapshot may include the state of the primary system that has changed since a last backup snapshot of the primary system. In some embodiments, a full backup snapshot includes the entire state of a workload at a particular point in time. In some embodiments, an incremental backup snapshot includes the state of a workload that has changed since a last backup snapshot of the workload.

A backup snapshot policy may indicate that a backup snapshot is to be performed on a periodic basis (e.g., hourly, daily, weekly, monthly, etc.). In some embodiments, a backup snapshot policy indicates that a backup snapshot is to be backed up when a threshold size of data (e.g., a size of data associated with a primary system, a size of data associated with a workload) has changed. In some embodiments, a backup snapshot policy indicates that a backup snapshot is to be performed upon a command from a user associated with a primary system.

A storage system may receive and ingest the data included in a backup snapshot. The data included in the backup snapshot may be organized using a tree data structure as described in U.S. patent application Ser. No. 16/549,719 entitled "Continuous Data Protection Using A Write Filter," filed on Aug. 23, 2019, the entire contents of which are incorporated by reference. The storage system may generate and store a corresponding tree data structure for each backup snapshot.

The contents included in a backup snapshot may be indexed. For example, an index may indicate which version of an application was backed up in the backup snapshot, which version of a virtual machine was backed up in the backup snapshot, etc. The index may also indicate which portions of the backup snapshot have been scanned for vulnerabilities. For example, the index may indicate that a version of an application was scanned for vulnerabilities, a version of a virtual machine was scanned for vulnerabilities, or the entire backup snapshot was scanned for vulnerabilities.

The storage system may scan at least a portion of a backup snapshot for one or more vulnerabilities. The scanned portion may correspond to one or more workloads. The storage system may restore to a temporary environment one of the workloads (e.g., sandbox) and perform a vulnerability scan on the restored workload. In some embodiments, the scanned portion corresponds to the entire portion of the backup snapshot. The storage system may restore to a temporary environment a version of the primary system corresponding to a backup snapshot and perform a vulnerability scan on the restored version of the primary system. Advantageously, the storage system may determine the one or more vulnerabilities associated with at least a portion of the backup snapshot without having to use primary system resources to determine the one or more vulnerabilities.

The storage system is comprised of a plurality of storage nodes. Each storage node has a corresponding processor. In some embodiments, a plurality of the storage nodes perform the vulnerability scan together. In some embodiments, one of the storage nodes performs the vulnerability scan. Regardless of whether a plurality of the storage nodes or one of the storage nodes performs the vulnerability scan, the one or more storage nodes have a finite amount of resources available to perform the vulnerability scan. The one or more storage nodes may have one or more primary functionalities to perform (e.g., backing up data, replicating data, restoring data, etc.) and/or one or more other tasks (e.g., garbage collection, defragmentation, providing a test/dev environment, etc.). Performing the vulnerability scan reduces the total amount of resources available for the one or more storage nodes to perform the one or more primary functionalities and/or one or more other tasks (e.g., garbage collection, defragmentation, providing a test/dev environment, etc.). In the event a vulnerability scan is performed, the storage system may allocate a certain amount of resources to perform the vulnerability scan during the scan period (e.g., 30-60 minutes) and the certain amount of resources may not be re-allocated.

Depending on the frequency at which the storage system receives backup snapshot data from a primary system, it may not be practical and/or possible for the storage system to scan each of the received backup snapshots. For example, a primary system may perform a backup snapshot every hour. The amount of data that has changed between backup snapshot versions may be minimal (e.g., less than a change threshold amount). Performing a scan on at least a portion of each backup snapshot every hour may not be practical because the storage system may need to allocate the resources needed for the vulnerability scan to one or more other processes. Performing a scan on at least a portion of each backup snapshot may not be possible because the storage system has already allocated the resources needed for the vulnerability scan to one or more other processes.

The storage system may assign a corresponding scanning score to each of the backup snapshots received from a primary system. The storage system may select which of the plurality of backup snapshots to scan based on the corresponding scanning score associated with a backup snapshot. A scanning score associated with a backup snapshot may be based on a plurality of factors. For example, the scanning score may be based on a snapshot distance between a particular backup snapshot and a latest backup snapshot, a snapshot distance between the particular backup snapshot and a previous scan, a snapshot distance between the particular backup snapshot and a previous scan that included one or more critical vulnerabilities, and/or the amount of change associated with the particular backup snapshot. A snapshot distance may be the amount of time between backup snapshots, the number of backup snapshots in the chain of snapshot trees between the snapshot tree corresponding to the particular backup snapshot and the latest backup snapshot, etc. The scanning score associated with a backup snapshot may be periodically updated. The one or more backup snapshots with a corresponding scanning score above a threshold value may be scanned. This may ensure that an adequate sample of backup snapshots are scanned for vulnerabilities without unnecessarily taxing the resources of the storage system. In some embodiments, the storage system selects which of the plurality of backup snapshots to scan using a lottery scheduling algorithm.

At least a portion of a selected backup snapshot may be restored to a temporary environment of the storage system to create a restored instance of at least a portion of the selected backup snapshot. A vulnerability scan may be performed on the restored instance of at least the portion of the selected snapshot. The vulnerability scan may discover one or more vulnerabilities associated with the selected backup snapshot and assign a corresponding vulnerability score to each of the one or more discovered vulnerabilities. The assigned vulnerability score may be based on a vulnerability score assigned to a vulnerability by a government entity. For example, the government entity may use a common vulnerability scoring system (CVSS) to assign a score to a vulnerability.

The one or more vulnerabilities associated with a plurality of scanned portions of backup snapshots may be tracked. Some vulnerabilities may be more critical than others. The response to a vulnerability may depend on the vulnerability score associated with the vulnerability. For example, a vulnerability having a vulnerability score less than a first threshold and greater than a minimum vulnerability score (e.g., "0") may be deemed to be non-critical and one or more remedies associated with the vulnerability may be optional. A vulnerability having a vulnerability score greater than or equal to the first threshold, but less than a second threshold may be deemed to be critical and one or more remedies may be recommended for the vulnerability. A vulnerability having a vulnerability score greater than or equal to the second threshold, but less than the maximum vulnerability score (e.g., "10") may be deemed to be very critical and one or more remedies may be required for the vulnerability. The storage system may store a data structure that associates a plurality of scanned portions of backup snapshots with their one or more corresponding vulnerabilities and corresponding vulnerability scores.

The storage system may rank the scanned portions of backup snapshots based on the one or more corresponding vulnerabilities associated with the scanned portions of backup snapshots. A scanned portion of a backup snapshot may be ranked based on the vulnerability of the one or more vulnerabilities having the highest vulnerability score. For example, a scanned portion of a backup snapshot may be associated with three vulnerabilities. The storage system may use the vulnerability of the three vulnerabilities having the highest vulnerability score to determine a ranking associated with the scanned portion of the backup snapshot.

The storage system may determine a recovery time associated with each of the scanned portions of backup snapshots. The recovery time associated with a scanned portion of a backup snapshot may be based on a specified security posture associated with a restore environment to which the data associated with a scanned portion of a backup snapshot is to be restored. For example, some restore environments may have higher security requirements than other restore environments. A restore environment with a high security posture may require all of the one or more vulnerabilities associated with a scanned portion of a backup snapshot to be remedied. A restore environment with a medium security posture may require all critical and very critical vulnerabilities to be remedied, but not any non-critical vulnerabilities. A restore environment with a low security posture may not require any of the one or more vulnerabilities to be remedied.

A scanned portion of a backup snapshot may be associated with a plurality of vulnerabilities. The storage system may filter the one or more vulnerabilities required to be remedied for the restore environment to which the data associated with a scanned portion of a backup snapshot is to be restored. For example, a scanned portion of a backup snapshot may be associated with three vulnerabilities: two very critical vulnerabilities and one non-critical vulnerability. A security posture of the restore environment may have a medium security posture and only require the two very critical vulnerabilities to be remedied. The storage system may determine the recovery time associated with the scanned portion of the backup snapshot based on the remedies associated with the two very critical vulnerabilities instead of determining the recovery time associated with the scanned portion of the backup snapshot based on all of the remedies associated with the scanned portion of the backup snapshot. This may reduce the total recovery time associated with restoring a scanned portion of a backup snapshot. In some embodiments, the storage system computes a corresponding recovery time associated with a scanned portion of a backup snapshot based on whether all of the vulnerabilities associated with a scanned portion of a backup snapshot are to be remedied, whether some of the vulnerabilities associated with a scanned portion of a backup snapshot are to be remedied, and/or whether none of the vulnerabilities associated with a scanned portion of a backup snapshot are to be remedied.

The storage system may generate an ordering of the one or more remedies to be applied to the scanned portion of a backup snapshot. For example, the storage system may determine a sequence of the one or more remedies that are to be applied to the data associated with a scanned portion of a backup snapshot to restore a restore system (e.g., a primary system).

The recovery time associated with a scanned portion of a backup snapshot may be based on a roll forward time associated with restoring a restore system. The roll forward time may include the amount of time needed to provide data associated with a scanned portion of a backup snapshot from the storage system to the restore system. The roll forward time may also include the amount of time needed by the restore system to restore the system to a state associated with the scanned portion of a backup snapshot. In some embodiments, the data associated with a particular version of a virtual machine may be provided from the storage system to the restore system. In some embodiments, all of the data associated with a scanned backup snapshot is provided from the storage system to the restore system. For example, a restore system is being restored to a particular version of a primary system.

The recovery time associated with a scanned portion of a backup snapshot may be based on a cumulative patch time associated with the one or more remedies. The cumulative patch time is the amount of time needed to apply the one or more remedies to the restored data. The determined recovery time associated with each of the scanned portions of the backup snapshots may be based on the corresponding cumulative patch time associated with the one or more ordered remedies and the corresponding roll forward time associated with the scanned portions of backup snapshots.

The storage system may determine a plurality of recovery times associated with a scanned portion of a backup snapshot based on the different scenarios in which a scanned portion of a backup snapshot may be used to restore a restore system. The storage system may determine a corresponding recovery time based on the different security postures, the different roll forward times (e.g., restore different portions of a backup snapshot versus restore an entire portion of a backup snapshot), the different cumulative patch times (e.g., apply all remedies, some remedies, no remedies), and/or a combination thereof.

The storage system may receive a request associated with identifying a backup snapshot to restore. A restore system, such as a primary system, may be restored using any of the scanned portions of backup snapshots, however, a user associated with the restore system may need guidance in selecting a scanned portion of a backup snapshot. The user associated with the restore system may need guidance in selecting a version of a selected scanned portion of a backup snapshot. The restore system may request the system to be restored to a state associated with a particular day or a particular time period (e.g., range of hours, range of days, etc.).

In response to the request, the storage system may provide an interface that indicates the one or more scanned portions of backup snapshots associated with the request and their one or more corresponding vulnerabilities. The interface may display one or more entries corresponding to one or more scanned portions of backup snapshots. An entry corresponding to a scanned portion of a backup snapshot may indicate whether a vulnerability associated with a scanned portion of a backup snapshot is very critical, critical, and/or non-critical. An entry may indicate one or more recovery times associated with a scanned portion of a backup snapshot. For example, the entry may indicate a recovery time associated with restoring the scanned portion of a backup snapshot to a high security posture restore environment, a recovery time associated with restoring the scanned portion of a backup snapshot to a medium security posture restore environment, and/or a recovery time associated with restoring the scanned portion of a backup snapshot to a low security posture restore environment.

The interface may provide a user associated with a restore system with the ability to filter versions of a selected scanned portion of a backup snapshot based on a security posture. For example, a user associated with a restore system may select a "high security posture." In response to the selection, the storage system may update the interface to associate the one or more scanned portions of backup snapshots and their corresponding one or more recovery times in the event the selected scanned portion of a backup snapshot is restored to a restore environment having a "high security posture."

The interface may provide a user associated with a restore system with the ability to filter versions of a selected backup snapshot based on a total amount of recovery time. For example, a user associated with the restore system may have a certain amount of time to restore the restore system. Some of the scanned portions of backup snapshots may have a corresponding recovery time that is greater than the certain amount of time. The storage system may update the interface to rank the scanned portions of backup snapshots based on the total amount of recovery time.

The storage system may also display the recovery time associated with different portions of a scanned backup snapshot. For example, the interface may indicate a recovery time associated with restoring a particular workload included in a backup snapshot. The interface may indicate a recovery time associated with restoring two of the workloads included in a backup snapshot. The interface may indicate a recovery time associated with restoring the entire backup snapshot. The interface may allow a user associated with the restore system to select the one or more workloads to restore and in response to the selection, the storage system may update the interface to indicate the corresponding recovery times associated with the selection of the one or more workloads.

A restore system may select one of the scanned portions of backup snapshots. In response to the request, the storage system may provide the data associated with the selected scanned portion of a backup snapshot. In response to receiving the data, the restore system may apply the one or more remedies associated with the selected scanned portion of a backup snapshot to the received data.

FIG. 1 is a block diagram illustrating a system for performing vulnerability scans in accordance with some embodiments. In the example shown, system 100 is comprised of a primary system 102 and a storage system 112. Primary system 102 is coupled to storage system 112 via connection 110. Connection 110 may be a wired or wireless connection. Connection 110 may be a LAN, WAN, intranet, the Internet, and/or a combination thereof.

Primary system 102 is a computing system that stores file system data. The file system data may include a plurality of files (e.g., content files, text files, etc.) and metadata associated with the plurality of files. Primary system 102 may be comprised of one or more servers, one or more computing devices, one or more storage devices, and/or a combination thereof. Primary system 102 may be configured to send a backup snapshot of file system data to storage system 112 according to one or more backup snapshot policies. In some embodiments, a backup snapshot policy indicates that file system data is to be backed up on a periodic basis (e.g., hourly, daily, weekly, monthly, etc.), when a threshold size of data has changed, or in response to a command from a user associated with primary system 102.

Primary system 102 may be configured to run one or more workloads 103. Examples of workloads include, but are not limited to, a virtual machine, a database, an application, a container, a pod, etc. Primary system 102 may include one or more storage volumes (not shown) that are configured to store file system data associated with primary system 102. The file system data associated with primary system 102 includes the data associated with the one or more workloads 103.

Backup agent 104 may be configured to cause primary system 102 to perform a backup snapshot (e.g., a full backup snapshot or incremental backup snapshot). A full backup snapshot may include all of the file system data of primary system 102 at a particular moment in time. In some embodiments, a full backup snapshot for a particular workload of the one or more workloads 103 is performed and the full backup snapshot of the particular workload includes all of the workload data associated with the particular workload at a particular moment in time. In some embodiments, backup agent 104 is running on primary system 102. In some embodiments, backup agent 104 is running in one of the one or more workloads 103. In some embodiments, a backup agent 104 is running on primary system 102 and a separate backup agent 104 is running in one of the one or more workloads 103. In some embodiments, a workload includes a backup function and is configured to perform a backup snapshot on its own without backup agent 104.

Storage system 112 is comprised of a storage cluster that includes a plurality of storage nodes 111, 113, 115. Although three storage nodes are shown, storage system 112 may be comprised of n storage nodes. The plurality of storage nodes may be comprised of one or more solid state drives, one or more hard disk drives, or a combination thereof. Each storage node may have its own corresponding processor. Storage system 112 may be configured to ingest a backup snapshot received from primary system 102 and configured to store the data associated with the backup snapshot across the storage cluster. Storage system 112 may be a cloud version of a secondary storage system as described in U.S. patent application Ser. No. 16/287,214 entitled "Deploying A Cloud Instance Of A User Virtual Machine," filed on Feb. 27, 2019, the entire contents of which are incorporated by reference.

Storage system 112 may receive and ingest the data associated with a backup snapshot. Storage system 112 may include a file system manager 117 that is configured to organize the file system data of the backup snapshot using a tree data structure. An example of the tree data structure is a snapshot tree, which may be based on a B+ tree structure (or other type of tree structure in other embodiments). Storage system 112 may generate a snapshot tree and one or more metadata structures for each backup snapshot. The contents included in a backup snapshot may be indexed. For example, an index may indicate which version of an application was backed up in the backup snapshot, which version of a virtual machine was backed up in the backup snapshot, etc. The index may also indicate which portions of the backup snapshot have been scanned for vulnerabilities. For example, the index may indicate that a version of an application was scanned for vulnerabilities, a version of a virtual machine was scanned for vulnerabilities, or the entire backup snapshot was scanned for vulnerabilities.

In the event the backup snapshot corresponds to all of the file system data of primary system 102, the view corresponding to the backup snapshot may be comprised of a snapshot tree and one or more workload metadata structures. The snapshot tree may be configured to store the metadata associated with primary system 102. A workload metadata structure may be configured to store the metadata associated with one of the one or more workloads 103. Each of the one or more workloads 103 may have a corresponding metadata structure.

In the event the backup snapshot corresponds to all of the workload data of one of the one or more workloads 103, the view corresponding to the backup snapshot may be comprised of a snapshot tree and one or more workload file metadata structures. The snapshot tree may be configured to store the metadata associated with one of the one or more workloads 103. A workload file metadata structure may be configured to store the metadata associated with a workload file included in the workload.

The tree data structure may be used to capture different restoration points. The tree data structure allows a chain of snapshot trees to be linked together by allowing a node of a later version of a snapshot tree to reference a node of a previous version of a snapshot tree. The previous version of the snapshot tree may correspond to an earlier backup snapshot. For example, a root node or an intermediate node of a snapshot tree corresponding to a second backup snapshot may reference an intermediate node or leaf node of a snapshot tree corresponding to a first backup snapshot.

A snapshot tree is a representation of a fully hydrated restoration point because it provides a complete view of a primary system or a workload at a particular moment in time. A fully hydrated restoration point is a restoration point that is ready for use without having to reconstruct a plurality of backups to use it. Instead of reconstructing a restoration point by starting with a full backup and applying one or more data changes associated with one or more incremental backups to the data associated with the full backup, storage system 112 maintains fully hydrated restoration points. Any file associated with primary system 102 or a workload at a particular time and the file's contents, for which there is an associated reference restoration point, may be determined from the snapshot tree, regardless if the associated reference restoration was a full reference restoration point or an intermediate reference restoration point.

A snapshot tree may include a root node, one or more levels of one or more intermediate nodes associated with the root node, and one or more leaf nodes associated with an intermediate node of the lowest intermediate level. The root node of a snapshot tree may include one or more pointers to one or more intermediate nodes. Each intermediate node may include one or more pointers to other nodes (e.g., a lower intermediate node or a leaf node). A leaf node may store file system metadata, data associated with a file that is less than a limit size, an identifier of a data brick, a pointer to a metadata structure (e.g., workload metadata structure or a workload file metadata structure), a pointer to a data chunk stored on the storage cluster, node reservation information, file offset information associated with a combined metadata structure, etc.

A metadata structure (e.g., workload file metadata structure or workload metadata structure) may include a root node, one or more levels of one or more intermediate nodes associated with the root node, and one or more leaf nodes associated with an intermediate node of the lowest intermediate level. The tree data structure associated with a metadata structure allows a chain of metadata structures corresponding to different versions of a workload or a workload file to be linked together by allowing a node of a later version of a metadata structure to reference a node of a previous version of a metadata structure.

A metadata structure may be associated with a plurality of chunk files. A chunk file may be comprised of a plurality of data chunks. Metadata store 114 may store one or more metadata structures. In some embodiments, a metadata structure corresponds to a workload. In other embodiments, a metadata structure corresponds to a workload file. In other embodiments, a metadata structure corresponds to a portion of a workload. In other embodiments, a metadata structure corresponds to a portion of a workload file.

A leaf node of a metadata structure may store a value, such as an identifier of a data brick associated with one or more data chunks. The location of the one or more data chunks associated with a data brick may be identified using one or more data structures (e.g., list, table, etc.) stored in metadata store 114. A first data structure (e.g., chunk metadata table) may store information that associates a brick identifier with one or more chunk identifiers and one or more chunk file identifiers. A second data structure (e.g., chunk file metadata table) may associate a chunk file identifier with a chunk file storing a plurality of data chunks. In some embodiments, the first data structure and the second data structure are combined as a single data structure. The one or more data chunks associated with a data brick may be located based on the chunk metadata table and the chunk file metadata table. For example, a first data brick having a first brick identifier may be associated with a first chunk identifier (e.g., SHA-1 hash value). The first chunk identifier may be used in conjunction with the chunk metadata table to identify a chunk file identifier. A chunk file having the identified chunk file identifier is comprised of a plurality of data chunks. The chunk file metadata table may be used to identify a location of the plurality of data chunks. The chunk file metadata table may include offset information of the plurality of data chunks within a chunk file.

Depending on the frequency at which storage system 112 receives backup snapshot data from primary system 102, it may not be practical and/or possible to scan each of the received backup snapshots. For example, primary system 102 may perform a backup snapshot every four hours. The amount of data that has changed between backup snapshot versions may be little. Performing a scan on at least a portion of each backup snapshot every four hours may not be practical because storage system 112 may need to allocate the resources needed for the vulnerability scan to one or more other processes. Performing a scan on at least a portion of each backup snapshot may not be possible because storage system 112 has already allocated the resources needed for the vulnerability scan to one or more other processes.

Storage system 112 may store a plurality of backup snapshots received from primary system 102. It may not be practical and/or possible to scan all of the plurality of backup snapshots for vulnerabilities. Storage system 112 may assign a corresponding scanning score to each of the backup snapshots received from primary system 102. The storage system may select which of the plurality of backup snapshots to scan based on the corresponding scanning score associated with a backup snapshot. A scanning score associated with a backup snapshot may be based on a plurality of factors. For example, the scanning score may be based on a snapshot distance between a particular backup snapshot and a latest backup snapshot, a snapshot distance between the particular backup snapshot and a previous scan, a snapshot distance between the particular backup snapshot and a previous scan that included one or more critical vulnerabilities, and/or the amount of change associated with the particular backup snapshot. A snapshot distance may be the amount of time between backup snapshots, the number of backup snapshots in the chain of snapshot trees between the snapshot tree corresponding to the particular backup snapshot and the latest backup snapshot, etc.

The one or more backup snapshots with a score above a threshold value may be scanned. This may ensure that an adequate sample of backup snapshots are scanned for vulnerabilities without unnecessarily taxing the resources of the storage system. In some embodiments, the storage system selects which of the plurality of backup snapshots to scan using a lottery scheduling algorithm.

Storage system 112 may include a temporary environment 118 to restore and scan at least a portion of a selected snapshot to create a restored instance of the portion of the selected snapshot. An example of temporary environment 118 is a sandbox testing environment.

In some embodiments, storage system 112 may restore to temporary environment 118 a version of primary system 102 corresponding to a backup snapshot and perform a vulnerability scan on the restored version of the primary system. Storage system 112 may restore the version of primary system 102 corresponding to a backup snapshot in part by cloning a view associated with a version of primary system 102 corresponding to a backup snapshot. In some embodiments, the view associated with the version of primary system 102 corresponding to a backup snapshot is cloned by copying the root node associated with the version of primary system 102.

In some embodiments, storage system 112 may restore to temporary environment 118 a version of a workload 103 corresponding to a backup snapshot and perform a vulnerability scan on the restored version of the workload. Storage system 112 may restore the version of the workload 103 corresponding to a backup snapshot in part by cloning a view associated with the version of a workload 103 corresponding to a backup snapshot. In some embodiments, the view associated with the version of workload 103 corresponding to a backup snapshot is cloned by copying the root node associated with the version of the workload 103. The view associated with the version of primary system 102 corresponding to a backup snapshot and/or the view associated with the version of workload 103 corresponding to a backup snapshot may be cloned, using the technique described in U.S. patent application Ser. No. 16/549,719 entitled "Continuous Data Protection Using A Write Filter," filed on Aug. 23, 2019. Storage system 112 may further restore the version of primary system 102 or a workload 103 in part by providing access, in temporary environment 118, to the data associated with the cloned view.

Storage system 112 may scan the restored portion of the selected backup snapshot for one or more vulnerabilities. Storage system 112 may obtain one or more lists of known vulnerabilities associated with one or more applications. The one or more lists of known vulnerabilities associated with one or more applications may include corresponding vulnerability scores for each of the known vulnerabilities. A government entity may assign the corresponding vulnerability scores using a CVSS. The restored portion of the selected backup snapshot may include at least one of the known vulnerabilities. A vulnerability scan of the restored portion of the selected backup snapshot may determine the one or more vulnerabilities associated with the restored portion of the selected backup snapshot. Storage system 112 may assign a corresponding vulnerability score to each of the one or more determined vulnerabilities associated with the restored portion of the selected backup snapshot.

Storage system 112 may store a data structure (e.g., list, map, etc.) that tracks the one or more vulnerabilities associated with a scanned backup snapshot. The data structure may include a plurality of entries, each entry corresponding to one of the scanned portions of a backup snapshot. The entry may associate a scanned portion of a backup snapshot with the one or more known vulnerabilities and a recovery time associated with the scanned portion of the backup snapshot. The data structure may indicate all of the potential remedies associated with a scanned portion of a backup snapshot as well as all of the required remedies associated with the scanned portion of a backup snapshot.

Storage system 112 may determine a recovery time associated with a scanned portion of a backup snapshot. The recovery time associated with a scanned portion of a backup snapshot may be based on a specified security posture associated with an environment in which the data associated with a scanned portion of a backup snapshot is to be restored. For example, some restore environments may have higher security requirements than other restore environments. A restore environment with a high security posture may require all of the one or more vulnerabilities associated with a scanned portion of a backup snapshot to be remedied. A restore environment with a medium security posture may require all critical and very critical vulnerabilities to be remedied, but not any non-critical vulnerabilities. A restore environment with a low security posture may not require any of the one or more vulnerabilities to be remedied.

A scanned portion of a backup snapshot may be associated with a plurality of vulnerabilities. Storage system 112 may filter the one or more vulnerabilities required to be remedied for the restore environment to which the data associated with a scanned portion of a backup snapshot is to be restored. For example, a scanned portion of a backup snapshot may be associated with three vulnerabilities: two very critical vulnerabilities and one non-critical vulnerability. A security posture of the restore environment may have a medium security posture and only require the two very critical vulnerabilities to be remedied. Storage system 112 may determine the recovery time associated with the scanned portion of the backup snapshot based on the remedies associated with the two very critical vulnerabilities instead of determining the recovery time associated with the scanned portion of the backup snapshot based on all of the remedies associated with the scanned portion of the backup snapshot. In some embodiments, the storage system computes a corresponding recovery time associated with a scanned portion of a backup snapshot based on whether all of the vulnerabilities associated with a scanned portion of a backup snapshot are to be remedied, whether some of the vulnerabilities associated with a scanned portion of a backup snapshot are to be remedied, and/or whether none of the vulnerabilities associated with a scanned portion of a backup snapshot are to be remedied.

Storage system 112 may generate an ordering of one or more remedies to be applied to the scanned portion of a backup snapshot. For example, storage system 112 may determine a sequence of the one or more remedies that are to be applied to the data associated with a scanned portion of a backup snapshot portion to restore a restore system (e.g., a primary system).

The recovery time associated with a scanned portion of a backup snapshot may be based on a roll forward time associated with restoring a restore system (e.g., primary system 102). The roll forward time may include the amount of time needed to provide data associated with a scanned portion of a backup snapshot from storage system 112 to the restore system. The roll forward time may also include the amount of time needed by the restore system to restore the system to a state associated with the scanned portion of the backup snapshot. In some embodiments, the data associated with a particular version of a virtual machine is provided from storage system 112 to the restore system. In some embodiments, all of the data associated with a scanned portion of a backup snapshot is provided from storage system 112 to the restore system. For example, a restore system is being restored to a particular version of primary system 102.

The recovery time associated with a scanned portion of a backup snapshot may be based on a cumulative patch time associated with the one or more remedies. The cumulative patch time is the amount of time needed to apply the one or more remedies to the restored data. The determined recovery time associated with each of the scanned backup snapshots may be based on the corresponding cumulative patch time associated with the one or more remedies and the corresponding roll forward time associated with at least a portion of the scanned backup snapshot.

Storage system 112 may determine a plurality of recovery times associated with a scanned portion of a backup snapshot based on the different scenarios in which a scanned portion of a backup snapshot may be used to restore a restore system. The storage system may determine a corresponding recovery time based on the different security postures, the different roll forward times (e.g., restore different portions of a backup snapshot versus restore an entire portion of a backup snapshot), the different cumulative patch times (e.g., apply all remedies, some remedies, no remedies), and/or a combination thereof.

Storage system 112 may receive a request associated with identifying a backup snapshot to restore. For example, primary system 102 may send a request to storage system 112 to restore the entire system or one of the workloads. Primary system 102 may be restored using any of the scanned portions of backup snapshots, however, a user associated with the primary system 102 may need guidance in selecting a scanned portion of a backup snapshot. The user associated with the restore system may need guidance in selecting a version of a selected scanned portion of a backup snapshot. The restore system may request the system to be restored to a state associated with a particular day or a particular time period (e.g., range of hours, range of days, etc.).

In response to the request, storage system 112 may provide an interface that indicates the one or more scanned portions of backup snapshots associated with the request and their one or more corresponding vulnerabilities. The interface may display one or more entries corresponding to one or more scanned portions of backup snapshots. An entry corresponding to a scanned portion of a backup snapshot may indicate whether a vulnerability associated with a scanned portion of a backup snapshot is very critical, critical, and/or non-critical. An entry may indicate one or more recovery times associated with a scanned portion of a backup snapshot. For example, the entry may indicate a recovery time associated with restoring the scanned portion of a backup snapshot to a high security posture restore environment, a recovery time associated with restoring the scanned portion of a backup snapshot to a medium security posture restore environment, and/or a recovery time associated with restoring the scanned portion of a backup snapshot to a low security posture restore environment.

The interface may provide a user associated with a restore system with the ability to filter versions of a selected backup snapshot based on a security posture. For example, a user associated with a restore system may select a "high security posture." In response to the selection, storage system 112 may update the interface to associate the one or more scanned portions of backup snapshots and their corresponding one or more recovery times in the event the selected backup snapshot is restored to a restore environment having a "high security posture."

The interface may provide a user associated with a restore system with the ability to filter versions of a selected scanned portion of a backup snapshot based on a total amount of recovery time. For example, a user associated with the restore system may have a certain amount of time to restore the restore system. Some of the scanned portions of backup snapshots may have a corresponding recovery time that is greater than the certain amount of time. Storage system 112 may update the interface to rank the scanned portions of backup snapshots based on the total amount of recovery time.

Storage system 112 may also display the recovery time associated with different portions of a scanned portion of a backup snapshot. For example, the interface may indicate a recovery time associated with restoring a particular workload included in a backup snapshot. The interface may indicate a recovery time associated with restoring the entire backup snapshot. The interface may allow a user associated with the restore system to select the one or more workloads to restore and in response to the selection, storage system 112 may update the interface to indicate the corresponding recovery times associated with the selection of the one or more workloads.

A requesting system may select one of the scanned portions of backup snapshots. In response to the request, storage system 112 may provide the data associated with the selected scanned portion of a backup snapshot. In some embodiments, storage system 112 may traverse a tree data structure corresponding to the selected scanned portion of a backup snapshot to locate the data associated with the selected scanned portion of a backup snapshot and provide the located data to the requesting system. In response to receiving the data, the requesting system may apply the one or more remedies associated with the selected scanned backup snapshot to the received data.

Figure 2:
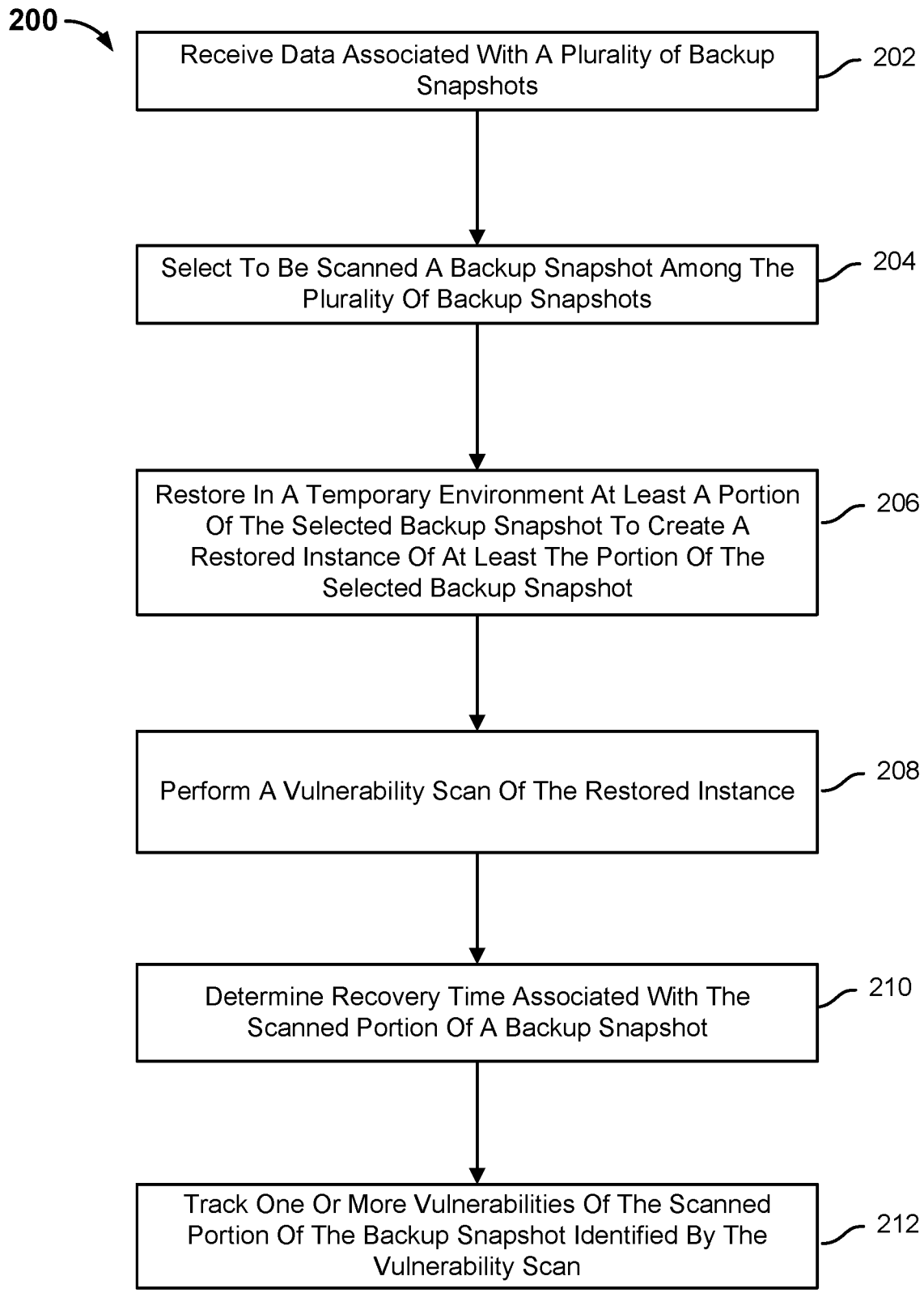
FIG. 2 is a flow chart illustrating a process for performing a vulnerability scan in accordance with some embodiments.

FIG. 2 is a flow chart illustrating a process for performing a vulnerability scan in accordance with some embodiments. In the example shown, process 200 may be performed by a storage system, such as storage system 112. Process 200 may be periodically performed by a storage system. In some embodiments, process 200 is performed when the storage system has a sufficient amount of resources to perform process 200. Process 200 may be separately performed for a plurality of backup snapshots to generate a plurality of scanned backup snapshots.

At 202, data associated with a plurality of backup snapshots is received. A primary system may perform a backup snapshot and send file system data associated with the primary system to a storage system. The backup snapshot may be a full backup snapshot or an incremental backup snapshot. The backup snapshot may be a backup of the entire primary system or a backup of one or more workloads hosted by the primary system. The backup snapshot may be performed according to a backup snapshot policy. A backup snapshot policy may indicate that file system data is to be backed up on a periodic basis (e.g., hourly, daily, weekly, monthly, etc.), when a threshold size of data has changed, and/or upon a command from a user associated with a primary system.

A storage system may receive the data associated with a plurality of backup snapshots, store the data associated with the plurality backup snapshots, and generate corresponding tree data structures for the plurality of backup snapshots. A tree data structure may organize and store the metadata associated with the backup snapshot data. An example of the tree data structure is a snapshot tree. In some embodiments, each snapshot tree corresponds to a version of the primary system to which the primary system may be restored. In some embodiments, each snapshot tree corresponds to a version of a workload hosted on the primary system to which the workload may be restored.

At 204, a backup snapshot among the plurality of backup snapshots is selected to be scanned. The backup snapshot may be selected to be scanned based on a corresponding scanning score associated with the backup snapshot. Each of the backup snapshots may have a corresponding scanning score. The scanning score may indicate whether a backup snapshot is ripe for a vulnerability scan. The scanning score associated with a backup snapshot may be compared to a threshold value. A backup snapshot may be selected in the event the scanning score is greater than or equal to the threshold value. This may ensure that an adequate sample of backup snapshots are scanned for vulnerabilities without unnecessarily taxing the resources of the storage system.

At 206, at least a portion of the selected backup snapshot is restored to a temporary environment to create a restored instance of at least a portion of the selected backup snapshot. The portion of the selected snapshot may correspond to a workload hosted by a primary system. For example, a virtual machine hosted by a primary system may be restored to a temporary environment. In some embodiments, the portion of the selected snapshot is the entire portion of the selected snapshot and the entire primary system is restored to the temporary environment.

At 208, a vulnerability scan of the restored instance is performed. One or more vulnerabilities associated with the restored instance may be detected. The storage system may obtain from a third party system, such as a government entity, a corresponding vulnerability score for the one or more detected vulnerabilities.

At 210, a recovery time associated with the scanned portion of a backup snapshot is determined. Each of the one or more detected vulnerabilities may have a corresponding remedy. The corresponding remedy may have an associated roll forward time.

At 212, one or more vulnerabilities of the scanned portion of a backup snapshot identified by the vulnerability scan are tracked. A storage system may store a data structure (e.g., list, map, etc.) that tracks the one or more vulnerabilities associated with a scanned portion of a backup snapshot. The data structure may include a plurality of entries, each entry corresponding to one of the scanned portions of backup snapshots. The entry may associate a scanned portion of a backup snapshot with the one or more known vulnerabilities and a recovery time associated with a scanned portion of a backup snapshot. The data structure may indicate all of the potential remedies associated with a scanned portion of a backup snapshot as well as all of the required remedies associated with the scanned portion of the backup snapshot.

Figure 3:
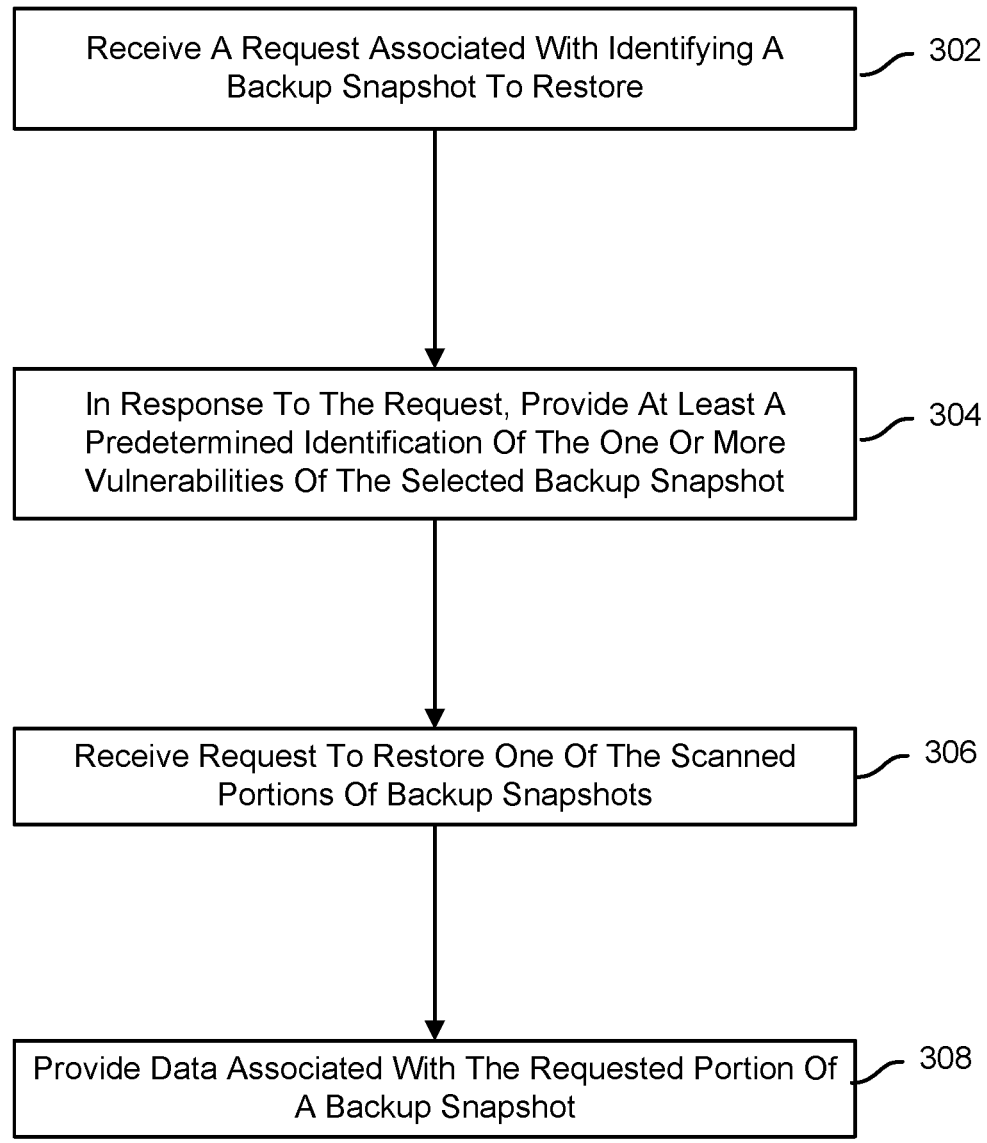
FIG. 3 is a flow chart illustrating a process for restoring a backup snapshot in accordance with some embodiments.

FIG. 3 is a flow chart illustrating a process for restoring a backup snapshot in accordance with some embodiments. In the example shown, process 300 may be implemented by a storage system, such as storage system 112.

At 302, a request associated with identifying a backup snapshot to restore from a plurality of scanned backup snapshots is received. A restore system may be restored using any of the scanned portions of backup snapshots, however, a user associated with the restore system may need guidance in selecting a scanned portion of a backup snapshot. The user associated with the restore system may need guidance in selecting a version of a selected scanned portion of a backup snapshot. The restore system may request the system to be restored to a state associated with a particular day or a particular time period (e.g., range of hours, range of days, etc.). A storage system may receive the request associated with identifying a backup snapshot to restore. The request may be a request to restore the entire system or to restore one or more of the workloads. For example, the storage system may receive a request to restore a primary system to one of the backup snapshots that was performed yesterday.

At 304, in response to the request, at least a predetermined identification of the one or more vulnerabilities of the selected scanned portion of a backup snapshot is provided.

The storage system may provide an interface that indicates the one or more scanned portions of backup snapshots associated with the request and their one or more corresponding vulnerabilities. For example, the interface may display the one or more scanned backup snapshots that were performed yesterday. The interface may display one or more entries corresponding to one or more scanned portions of backup snapshots. An entry may indicate the one or more vulnerabilities associated with a scanned portion of a backup snapshot. An entry corresponding to a scanned portion of a backup snapshot may indicate whether a vulnerability associated with a scanned portion of a backup snapshot is very critical, critical, and/or non-critical. An entry may indicate one or more recovery times associated with a scanned portion of a backup snapshot. For example, the entry may indicate a recovery time associated with restoring the scanned portion of a backup snapshot to a high security posture restore environment, a recovery time associated with restoring the scanned portion of a backup snapshot to a medium security posture restore environment, and/or a recovery time associated with restoring the scanned portion of a backup snapshot to a low security posture restore environment.

The interface may provide a user associated with a restore system with the ability to filter versions of a selected scanned portion of a backup snapshot based on a security posture. For example, a user associated with a restore system may select a "high security posture." In response to the selection, the storage system may update the interface to associate the one or more scanned portions of backup snapshots and their corresponding one or more recovery times in the event the selected backup snapshot is restored to a restore environment having a "high security posture."

The interface may provide a user associated with a restore system with the ability to filter versions of a selected scanned portion of a backup snapshot based on a total amount of recovery time. For example, a user associated with the restore system may have a certain amount of time to restore the restore system. Some of the scanned portions of backup snapshots may have a corresponding recovery time that is greater than the certain amount of time. The storage system may update the interface to rank the scanned portions of backup snapshots based on the total amount of recovery time.

The storage system may also display the recovery time associated with different portions of a scanned backup snapshot. For example, the interface may indicate a recovery time associated with restoring a particular workload included in a backup snapshot. The interface may indicate a recovery time associated with restoring the entire backup snapshot. The interface may allow a user associated with the restore system to select the one or more workloads to restore and in response to the selection, the storage system may update the interface to indicate the corresponding recovery times associated with the selection of one or more workloads.

The interface may provide a user associated with a restore system with the ability to select which of the one or more vulnerabilities associated with a scanned portion of a backup snapshot to remedy.

At 306, a request to restore one of the scanned portions of backup snapshots is received. At 308, the data associated with the requested scanned portion of a backup snapshot is provided. In some embodiments, the storage system may traverse a tree data structure corresponding to the selected scanned portion of a backup snapshot to locate the data associated with the selected scanned portion of the backup snapshot and provide the located data to the requesting system. In response to receiving the data, the requesting system may apply the one or more remedies associated with the selected scanned portion of a backup snapshot to the received data.

Figure 4:
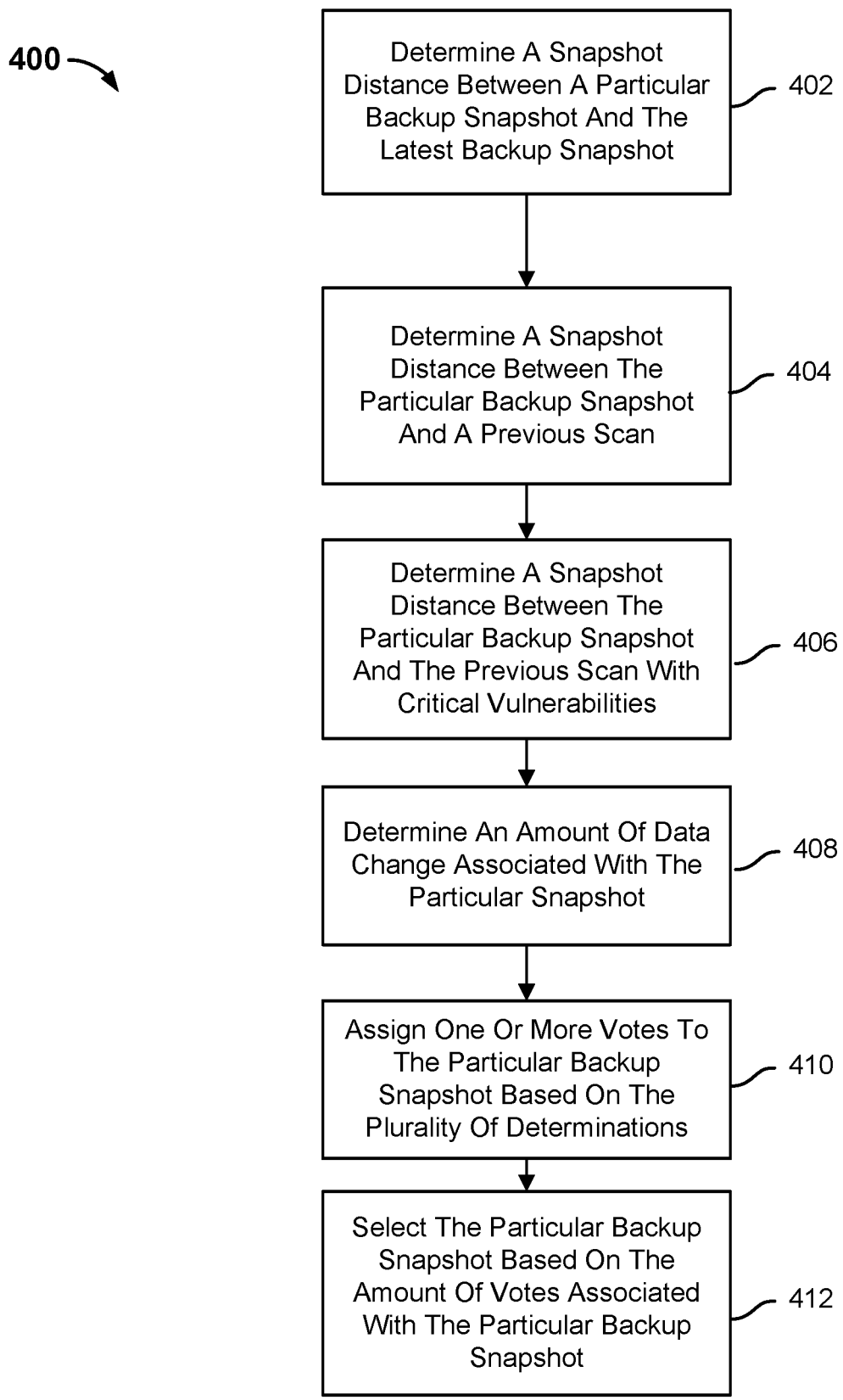
FIG. 4 is a flow chart illustrating a process for selecting a backup snapshot in accordance with some embodiments.

FIG. 4 is a flow chart illustrating a process for selecting a backup snapshot in accordance with some embodiments. In the example shown, process 400 may be implemented by a storage system, such as storage system 112. In some embodiments, process 400 may be implemented to perform some or all of step 204 of process 200.

At 402, a snapshot distance between a particular backup snapshot and a latest backup snapshot is determined. The snapshot distance between the particular backup snapshot and the latest backup snapshot may be the amount of time between the particular backup snapshot and the latest backup snapshot. The snapshot distance between the particular backup snapshot and the latest backup snapshot may be the number of backup snapshots in the chain of snapshot trees between the snapshot tree corresponding to the particular backup snapshot and the snapshot tree corresponding to the latest backup snapshot. In the event the snapshot distance between a particular backup snapshot and a latest backup snapshot is greater than a first threshold distance, then a scanning score associated with the particular backup snapshot may be increased (e.g., incremented).

At 404, a snapshot distance between the particular backup snapshot and a previous scan is determined. The snapshot distance between the particular backup snapshot and the previous scan may be the amount of time between the particular backup snapshot and the previous scan. The snapshot distance between the particular backup snapshot and the previous scan may be the number of backup snapshots in the chain of snapshot trees between the snapshot tree corresponding to the particular backup snapshot and the snapshot tree corresponding to the previous scan. In the event the snapshot distance between a particular backup snapshot and a previous scan is greater than a second threshold distance, then the scanning score associated with the particular backup snapshot may be increased (e.g., incremented).

At 406, a snapshot distance between the particular backup snapshot and a previous scan with one or more vulnerabilities is determined. The snapshot distance between the particular backup snapshot and the latest backup snapshot may be the amount of time between the particular backup snapshot and the previous scan with one or more vulnerabilities. The snapshot distance between the particular backup snapshot and the previous scan with one or more vulnerabilities may be the number of backup snapshots in the chain of snapshot trees between the snapshot tree corresponding to the particular backup snapshot and the snapshot tree corresponding to the previous scan with one or more vulnerabilities. In the event the snapshot distance between a particular backup snapshot and a previous scan with one or more vulnerabilities is greater than a third threshold distance, then the scanning score associated with the particular backup snapshot may be increased (e.g., incremented).

At 408, an amount of change associated with a particular backup snapshot is determined. In the event the amount of change associated with the particular backup snapshot is greater than a threshold amount, then the scanning score associated with the particular backup snapshot may be increased (e.g., incremented).

At 410, one or more votes to the particular backup snapshot are assigned based on the plurality of determinations. A particular backup snapshot may be assigned a vote in the event the snapshot distance is greater than the first threshold distance, the second threshold distance, or the third threshold distance. A particular backup snapshot may be assigned a vote in the event the amount of change is greater than the threshold vote. The scanning score associated with a backup snapshot may be the total number of votes associated with the backup snapshot. In some embodiments, the determinations performed in 402, 404, 406, and 408 have corresponding weights. Some determinations may be given greater weight than other determinations when deciding whether to scan a backup snapshot for one or more vulnerabilities.

At 412, the particular backup snapshot is selected based on the amount of votes associated with the particular backup snapshot. The total number of votes associated with a backup snapshot is compared to a scanning threshold value. In the event the total number of votes is greater than the scanning threshold value, the particular backup snapshot may be scanned for one or more vulnerabilities. In the event the total number of votes is not greater than the scanning threshold value, the particular backup snapshot may not be scanned for one or more vulnerabilities.

The determinations made in 402, 404, 406 and 408 may be performed on a periodic basis (e.g., after each backup snapshot, after every four backup snapshots, etc.), after a threshold number of backup snapshots, in response to a user command, etc.

Figure 5:
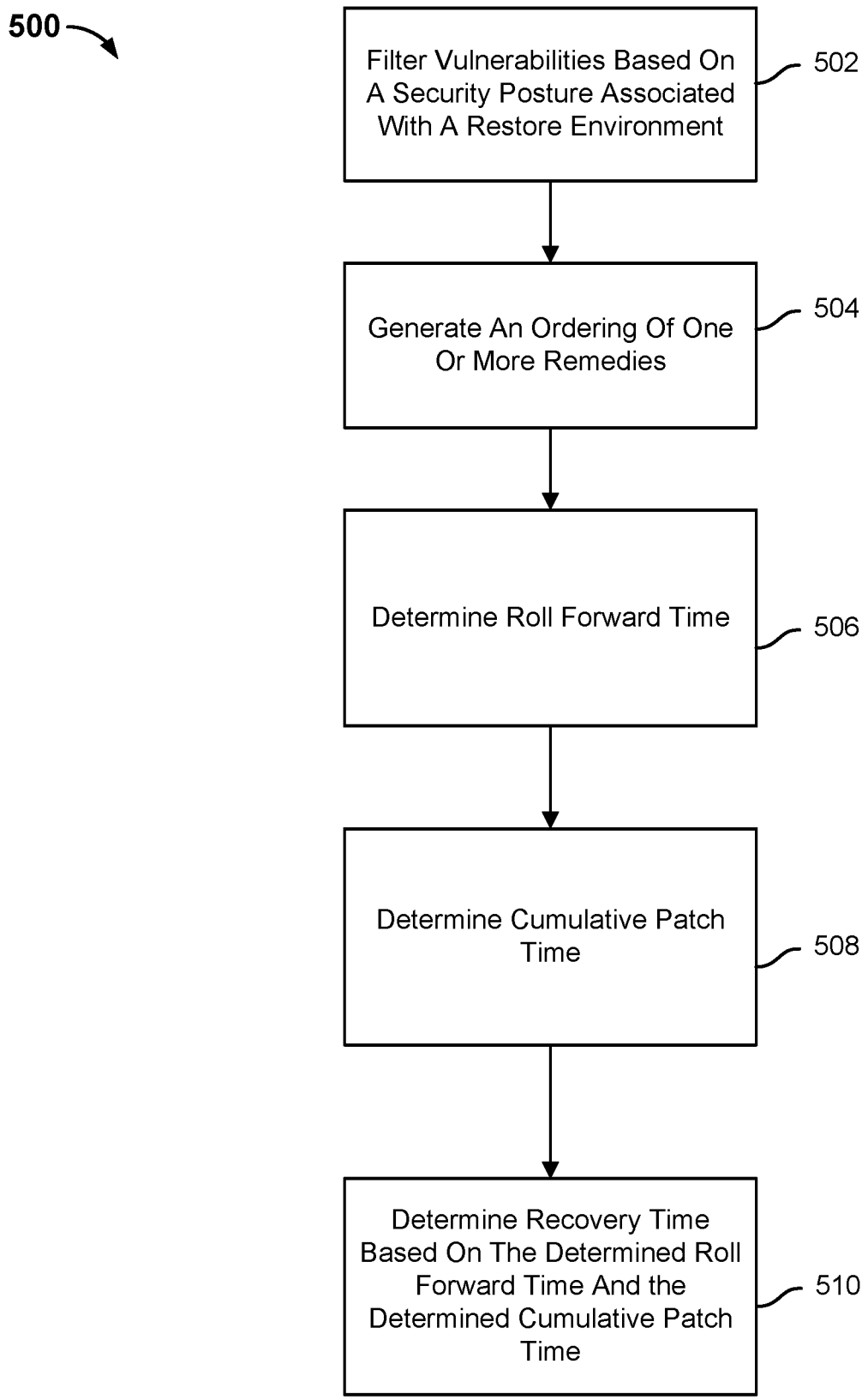
FIG. 5 is a flow chart illustrating a process for determining a recovery time associated with a backup snapshot in accordance with some embodiments.

FIG. 5 is a flow chart illustrating a process for determining a recovery time associated with a backup snapshot in accordance with some embodiments. In the example shown, process 500 may be implemented by a storage system, such as storage system 112. In some embodiments, process 500 may be implemented to perform some or all of step 210 of process 200.

At 502, one or more vulnerabilities are filtered based on a security posture associated with a restore environment. The data associated with at least a scanned portion of a backup snapshot may be restored to a restore system. The restore system may be operating in an environment with a corresponding security posture (e.g., network security zone). The corresponding security posture may be specified by a user associated with the restore system. A scanned portion of a backup snapshot may be associated with one or more vulnerabilities. The security posture associated with an environment may dictate the one or more vulnerabilities, if any, to be filtered.

A scanned portion of a backup snapshot may be associated with a plurality of vulnerabilities. The storage system may filter the one or more vulnerabilities required to be remedied for the restore environment to which the data associated with a scanned portion of a backup snapshot is to be restored. For example, a scanned portion of a backup snapshot may be associated with three vulnerabilities: two very critical vulnerabilities and one non-critical vulnerability. A security posture of the restore environment may have a medium security posture and only require the two very critical vulnerabilities to be remedied. The storage system may determine the recovery time associated with the scanned portion of a backup snapshot based on the remedies associated with the two very critical vulnerabilities instead of determining the recovery time associated with the scanned portion of a backup snapshot based on all of the remedies associated with the scanned snapshot. In some embodiments, the storage system computes a corresponding recovery time associated with a backup snapshot based on whether all of the vulnerabilities associated with a scanned portion of a backup snapshot are remedied, whether some of the vulnerabilities associated with a scanned portion of a backup snapshot are remedied, and/or whether none of the vulnerabilities associated with a scanned portion of a backup snapshot are remedied.

At 504, an ordering of one or more remedies associated with the one or more filtered vulnerabilities is generated. For example, the storage system may determine a sequence of the one or more remedies that are to be applied to the data associated with a scanned portion of a backup snapshot to restore a restore system (e.g., a primary system).

At 506, a roll forward time for the data associated with a selected scanned portion of a backup snapshot is determined. The roll forward time may include the amount of time needed to provide data associated with a scanned portion of a backup snapshot from the storage system to the restore system. The roll forward time may also include the amount of time needed by the restore system to restore the system to a state associated with the scanned portion of a backup snapshot.

In some embodiments, the data associated with a particular version of a virtual machine may be provided from the storage system to the restore system. In some embodiments, all of the data associated with a scanned backup snapshot is provided from the storage system to the restore system. For example, a restore system is being restored to a particular version of a primary system.

At 508, a cumulative patch time associated with the one or more ordered remedies is determined. The cumulative patch time is the amount of time needed to apply the one or more ordered remedies to the restored data. A remedy may include applying a software patch, changing an application configuration, deleting a file, etc. Each of the ordered remedies may have an associated patch time.

At 510, a recovery time based on the determined roll forward time and the determined cumulative patch time is determined. The recovery time may be the sum of the computed cumulative patch time and the computed roll forward time. The recovery time may be the sum of a weighted cumulative patch time and a weighted roll forward time.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   storing at a storage system a plurality of backup snapshots of a source system;
   selecting which of the plurality of backup snapshots to scan for one or more vulnerabilities by determining that a snapshot distance of a backup snapshot is greater than one or more threshold distances;
   scanning the selected backup snapshot including by:
      restoring in a temporary environment at least a portion of the selected backup snapshot to create a restored instance of at least the portion of the selected backup snapshot; and
      performing a vulnerability scan of the restored instance of at least the portion of the selected backup snapshot;
   tracking one or more corresponding vulnerabilities of the scanned portion of the selected backup snapshot;
   receiving a request to identify a scanned backup snapshot to restore from a plurality of scanned backup snapshots that includes the selected backup snapshot; and
   in response to the request, providing at least a predetermined identification of the one or more corresponding vulnerabilities of the selected backup snapshot.

2. The method of claim 1, wherein selecting which of the plurality of backup snapshots to scan for one or more vulnerabilities comprises determining the snapshot distance between the backup snapshot and a latest backup snapshot.

3. The method of claim 1, wherein selecting which of the plurality of backup snapshots to scan for one or more vulnerabilities comprises determining the snapshot distance between the backup snapshot and a previous scan.

4. The method of claim 1, wherein selecting which of the plurality of backup snapshots to scan for one or more vulnerabilities comprises determining the snapshot distance between the backup snapshot and a previous scan that included one or more critical vulnerabilities.

5. The method of claim 1, wherein selecting which of the plurality of backup snapshots to scan for one or more vulnerabilities comprises determining an amount of data change associated with the backup snapshot.

6. The method of claim 1, wherein selecting which of the plurality of backup snapshots to scan for one or more vulnerabilities comprises comparing a corresponding scanning score associated with the backup snapshot with a scanning threshold.

7. The method of claim 6, wherein the backup snapshot is selected among the plurality of backup snapshots in the event the corresponding scanning score of the backup snapshot is greater than or equal to the scanning threshold.

8. The method of claim 1, further comprising receiving data associated with the plurality of backup snapshots.

9. The method of claim 1, further comprising determining a recovery time to restore the scanned portion of the selected backup snapshot.

10. The method of claim 9, wherein determining the recovery time to restore the scanned portion of the selected backup snapshot comprises filtering the one or more corresponding vulnerabilities based on a security posture of a restore environment.

11. The method of claim 10, wherein determining the recovery time to restore the scanned portion of the selected backup snapshot comprises generating an ordering of one or more remedies to apply to the one or more filtered vulnerabilities.

12. The method of claim 11, wherein determining the recovery time to restore the scanned portion of the selected backup snapshot comprises determining a roll forward time to provide data of the scanned portion of the selected backup snapshot.

13. The method of claim 12, wherein determining the recovery time to restore the scanned portion of the selected backup snapshot comprises determining a cumulative patch time to apply the one or more ordered remedies.

14. The method of claim 13, wherein the recovery time to restore the scanned portion of the selected backup snapshot is determined based on the determined roll forward time to provide data of the scanned portion of the selected backup snapshot and the determined cumulative patch time to apply the one or more ordered remedies.

15. The method of claim 1, further comprising receiving a request to restore one of the scanned portions of the backup snapshots.

16. The method of claim 15, further comprising providing data associated with the requested one of the scanned portions of backup snapshots.

17. The method of claim 1, wherein the at least the portion of the selected backup snapshot includes some of the data associated with the selected backup snapshot.

18. The method of claim 1, wherein the at least the portion of the selected backup snapshot includes all of the data associated with the selected backup snapshot.

19. A computer program product, the computer program product being embodied in a non-transitory computer readable storage medium and comprising computer instructions for:
   storing at a storage system a plurality of backup snapshots of a source system;

selecting which of the plurality of backup snapshots to scan for one or more vulnerabilities by determining that a snapshot distance of a backup snapshot is greater than one or more threshold distances;

scanning the selected backup snapshot including by:
- restoring in a temporary environment at least a portion of the selected backup snapshot to create a restored instance of at least the portion of the selected backup snapshot; and
- performing a vulnerability scan of the restored instance of at least the portion of the selected backup snapshot;

tracking one or more corresponding vulnerabilities of the scanned portion of the selected backup snapshot;

receiving a request to identify a scanned backup snapshot to restore from a plurality of scanned backup snapshots that includes the selected backup snapshot; and in response to the request, providing at least a predetermined identification of the one or more corresponding vulnerabilities of the selected backup snapshot.

20. A system, comprising:
a processor; and
a memory coupled with the processor, wherein the memory is configured to provide the processor with instructions which when executed cause the processor to:

store at a storage system a plurality of backup snapshots of a source system;

select which of the plurality of backup snapshots to scan for one or more vulnerabilities by determining that a snapshot distance of a backup snapshot is greater than one or more threshold distances;

scan the selected backup snapshot including by:
- restoring in a temporary environment at least a portion of the selected backup snapshot to create a restored instance of at least the portion of the selected backup snapshot; and
- performing a vulnerability scan of the restored instance of at least the portion of the selected backup snapshot;

track one or more corresponding vulnerabilities of the scanned portion of the selected backup snapshot;

receive a request to identify a scanned backup snapshot to restore from a plurality of scanned backup snapshots that includes the selected backup snapshot; and in response to the request, provide at least a predetermined identification of the one or more corresponding vulnerabilities of the selected backup snapshot.

\* \* \* \* \*